United States Patent [19]

Yoshioka et al.

[11] Patent Number: 4,748,225

[45] Date of Patent: May 31, 1988

[54] SYNTHETIC RESIN MODIFIER

[75] Inventors: Hiroshi Yoshioka; Ichiro Ono, both of Annaka, Japan

[73] Assignee: Shin-Etsu Chemical Co., Ltd., Tokyo, Japan

[21] Appl. No.: 52,402

[22] Filed: May 21, 1987

[30] Foreign Application Priority Data

May 23, 1986 [JP] Japan .................................. 61-119910

[51] Int. Cl.$^4$ .............................................. C08G 77/04
[52] U.S. Cl. ...................................... 528/26; 556/442; 556/446; 556/450; 556/462; 528/26.5; 528/29
[58] Field of Search ............... 556/442, 446, 450, 462; 528/26.5, 26, 29

[56] References Cited

U.S. PATENT DOCUMENTS

| | | | |
|---|---|---|---|
| 4,496,704 | 1/1985 | Ginnings | 528/29 |
| 4,587,320 | 5/1986 | Swihart | 556/462 |
| 4,689,181 | 8/1987 | Blatch | 556/442 |

*Primary Examiner*—Melvyn I. Marquis
*Attorney, Agent, or Firm*—Schwartz, Jeffery, Schwaab, Mack, Blumenthal & Evans

[57] ABSTRACT

A synthetic resin modifier comprising an organopolysiloxane represented by General Formula (I):

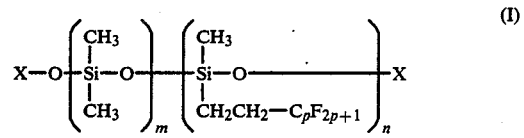

wherein the group represented by X consists of 2 to 40% by weight of a group represented by $R^1CO—$, wherein $R^1$ represents a saturated or unsaturated monovalent hydrocarbon group having 7 to 21 carbon atoms, and 60 to 98% by weight of a group represented by $R^2$—$(O\text{-}C_qH_{2q})_r$ wherein $R^2$ represents a saturated or unsaturated monovalent hydrocarbon group having 7 to 21 carbon atoms.

This modifier can be effective for any type of synthetic resins, imparting good lubricity and release properties to the surface of forms or molding products, including films, and improving the workability in the molding of synthetic resins.

4 Claims, No Drawings

SYNTHETIC RESIN MODIFIER

This invention relates to a modifier for synthetic resins, particularly to a modifier suitable for imparting good lubricity or release properties to the surface of forms of synthetic resins (including synthetic resin films formed on a product), and for improving workability in the molding of synthetic resins.

The conventional method of decreasing friction coefficient on the surface of forms of synthetic resins to impart lubricity and also impart release properties to the surface, is known to include a method in which waxes such as paraffin, carnauba wax and polyethylene, metal soaps, fats and oils, silicone fluids such as dimethyl silicone fluid and phenylmethyl silicone fluid are applied on the surface of forms as modifiers, or added to resin compounds before molding. These modifiers, having a lubricating performance, are added to resin compounds also for the purpose of improving the workability in the molding of synthetic resins.

Of the above modifiers, the dimethyl silicone fluid particularly is advantageous in that it has good release performances, can bring about lubricating properties suited for synthetic resins, is inert, and also have good thermal stability. Accordingly, it is widely used as compared with the other modifiers. However, even with such advantages, it has been still disadvantageous in that it can only accomplish the lubricity which may not be sufficient depending on what a molded product is used for, or that, because of its poor compatibility with synthetic resins, it can only achieve the lubricity and release properties which may not be maintained when added or used in synthetic resins.

For the purpose of eliminating such disadvantages, as modifier compounds, Japanese Patent Publication (KOKOKU) No. 50664/1983 describes an organosilicon compound represented by the general formula:

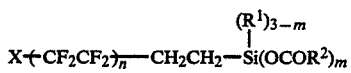

wherein $R^1$ is a monovalent hydrocarbon group having 1 to 6 carbon atoms, $R^2$ is a monovalent hydrocarbon group having 7 to 21 carbon atoms, X is a hydrogen atom or fluorine atom, n is an integer of 1 to 4 and m is 1, 2 or 3, and Japanese Unexamined Patent Publication (KOKAI) No. 41256/1981 describes an organopolysiloxane represented by the general formula:

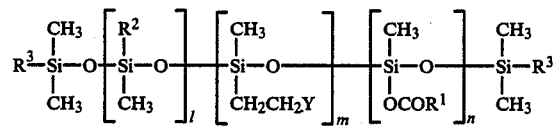

wherein $R^1$ is a monovalent hydrocarbon group having 7 to 21 carbon atoms; $R^2$ is methyl or phenyl group; $R^3$ is methyl group or a group represented by the formula $-OCOR^1$; Y is a group of $-CF_3$ or a group represented by the formula $-(CF_2CF_2)_{\overline{k}}W$, where W represents a hydrogen atom or fluorine atom and k is an integer of 1 to 4; l is an integer of 0 to 250, m is an integer of 1 to 100, n is an integer of 1 to 100, provided l, m and n satisfy $1+m+n \geq 300$ and $m+n \leq 1/5$; and the proportion of phenyl group in the whole organic groups bonded to the silicon atoms is 10 mole % or less.

These compounds can exhibit excellent modifier effects such that, when added to synthetic resins having a solubility parameter of less than 10.5, the surface friction coefficient may be lowered to bring about the lubricity of the surface, so that scratches may be hardly made and the release properties can be imparted. However, when added to synthetic resins having higher polarity and having a solubility parameter of not less than 10.5, such as cellulose resins, polyacrylonitrile resins, polyvinyl alcohol resins and polyamide resins, they are disadvantageous in that there may be caused a phase separation phenomenon due to poor compatibility between the resins and these compounds, resulting in an extreme decrease in the durability of the surface lubricity, and a badness of the appearance.

Accordingly, an object of this invention is to provide a novel synthetic resin modifier that can impart good lubricity or release properties to the surface of forms including films without regard to the type of synthetic resins, and also can improve the workability in molding processes.

To solve the problems involved in the above prior arts, this invention provides a synthetic resin modifier comprising an organopolysiloxane represented by General Formula (I):

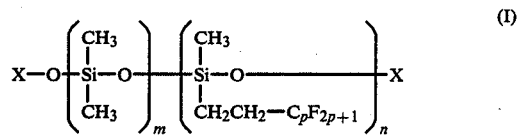

wherein the two types of diorganosiloxy units are arranged at random; the group represented by X consists of 2 to 40% by weight of a group represented by $R^1CO-$, wherein $R^1$ represents a saturated or unsaturated monovalent hydrocarbon group having 7 to 21 carbon atoms, and 60 to 98% by weight of a group represented by $R^2-(O-C_qH_{2q})_{\overline{l}}$, wherein $R^2$ represents a saturated or unsaturated monovalent hydrocarbon group having 7 to 21 carbon atoms, l represents an integer of 1 to 50, and q is a number of 2 to 4 on the average; m represents an integer of 1 to 50; n represents an integer of 1 to 20; and p represents an integer of 1 to 8.

The modifier of this invention may be added to a synthetic resin compound before molding, or to a coating material containing a synthetic resin as a main component, or may be applied on the surface of a resulting molded form, whereby the friction coefficient on the surface of forms or films can be made smaller, and good lubricity can be brought about, so that scratches may be hardly made and good release properties can be imparted. Moreover, the modifier of this invention, having good lubricating properties, may be also added to a molding resin, whereby the workability in the molding can be improved when films or any other various forms or molding products are produced. The synthetic resin modifier of this invention is effective for any type of synthetic resins.

In the organopolysiloxane represented by General Formula (I), m is required to be an integer of 1 to 50, preferably 10 to 50; and n, an integer of 1 to 20, preferably 1 to 15. The case where these conditions are not satisfied, namely, m is greater than 50 and/or n is greater than 20, may result in poor compatibility with synthetic resins, poor durability of the lubricity and release properties of the surface of forms, and badness of the appearance.

The carbon atom number represented by p, of the fluoroalkyl group is required to be 1 to 8. The case where p is greater than 8 may result in poor compatibility with synthetic resins, poor durability of the lubricity and release properties of the surface of forms, and badness of the appearance.

$R^1$ and $R^2$ each represent a saturated or unsaturated monovalent hydrocarbon group having 7 to 21 carbon atoms, including, for example, an alkyl group, an alkenyl group, an alkynyl group, an aryl group, an alkaryl group, an aralkyl group, etc., preferably a $C_7$ to $C_{21}$ alkyl, alkenyl, or alkynyl group such as $C_7H_{15}$-, $C_9H_{19}$-, $C_{11}H_{23}$-, $C_{13}H_{27}$-, $C_{15}H_{31}$-, $C_{17}H_{31}$, $C_{17}H_{33}$, $C_{17}H_{35}$, $C_{21}H_{43}$, and the like. The case where the carbon atom number in $R^1$ or $R^2$ is less than 7 may result in a lowering of the lubricating properties of the compound represented by General Formula (I), so that the workability in the molding of synthetic resins may be lowered and the lubricity and release properties of the surface of forms of synthetic resins may be also lowered. The case where the carbon atom number is more than 21 may result in an overly high melting point of the compound of General Formula (I) and also poor compatibility with synthetic resins, so that the workability in the molding of synthetic resins may be lowered and the durability of the lubricity and mole release properties of the surface of the resulting forms of synthetic resins, and the appearance thereof, may be worsened.

The group of $R^1CO-$ and the group of $R^2$-(-O-$C_qH_{2q}$)$_l$ in the group represented by X are required to be in the weight proportion of 2 to 40% by weight, preferably 2 to 20% by weight, in respect of the group of $R^1CO-$; and 60 to 98% by weight, preferably 80 to 98% by weight, in respect of the group of $R^2$-(-O-$C_qH_{2q}$)$_l$. The case where these requirements are not satisfied, namely, the group of $R^1CO-$ is in the proportion of less than 2% by weight and the group of $R^2$-(-O-$C_qH_{2q}$)$_l$ more than 98% by weight, may result in a lowering of the lubricating properties of the compound of General Formula (I), so that the workability in the molding of synthetic resins and the lubricity and release properties of the surface of the resulting forms of synthetic resins may be worsened. Also, the case where the group of $R^1CO-$ is in the proportion of more than 40% by weight and the group of $R^2$-(-O-$C_qH_{2q}$)$_l$ less than 60% by weight, may result in a lowering of the compatibility of the compound of General Formula (I) with synthetic resins, so that the durability of the lubricity and release properties of the surface of forms and the appearance thereof, may be worsened.

The production of the organopolysiloxane represented by General Formula (I) can be readily carried out, for example, by a known dehydration or elimination of alcohol reaction, namely, by reacting an organopolysiloxane compound represented by General Formula (II):

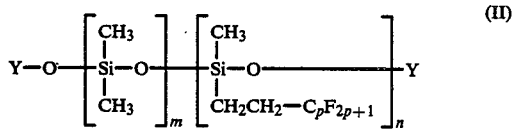

(II)

wherein the two types of diorganosiloxy units are arranged at random; Y represents a hydrogen atom, a methyl group or an ethyl group; m, n and p are as defined in General Formula (I) with a fatty acid represented by General Formula (III):

wherein $R^1$ is as defined in General Formula (I) and a polyoxyalkylene compound represented by General Formula (IV):

wherein $R^2$, q and l are as defined in General Formula (I) in the presence of a catalyst such as paratoluenesulfonic acid and trifluoroacetic acid and in a solvent such as toluene, benzene and xylene.

If necessary, or depending on the manner of use, the synthetic resin modifier of this invention may contain, in addition to the organopolysiloxane of General Formula (I), organic solvents including, for example, glycols such as methyl Cellosolve, ethyl Cellosolve and Carbitol; aromatic hydrocarbons such as benzene, toluene and xylene; ketones such as methyl ethyl ketone and methyl isobutyl ketone; and halohydrocarbons such as trifluoroethane and trichloroethane.

The synthetic resin modifier of this invention may be used in the manner such that it is added together with other additives including, for example, an internal lubricant such as butyl stearate and squalane which are appropriately added to a molding resin, or it is applied on the surface of forms of synthetic resins. In the instance it is added to the molding resin, the amount may vary depending on the type of resins, the purpose of modification, the compatibility of resins with the polyorganosiloxane to be added, and so forth, but, in general, may be in the range of 0.01 to 20 parts by weight, preferably 0.05 to 10 parts by weight, based on 100 parts by weight of the molding resin. The amount less than 0.01 may result in a small effect. On the other hand, even if the amount is made more than 20 parts by weight, any greater effect may not be expected, or, in some cases, there may be readily caused ill effects such as blooming and a lowering of strength of forms.

In the instance the modifier is applied on the surface of the forms of synthetic resins, the compound of General Formula (I) may be used for the coating as it is, but usually is desired to have been diluted with use of a suitable organic solvent so that the coating can be carried out with ease. The organic solvent to be used for such a purpose may include, for example, glycols such as methyl Cellosolve, ethyl Cellosolve and Carbitol; aromatic hydrocarbons such as benzene, toluene and xylene; ketones such as methyl ethyl ketone and methyl isobutyl ketone; esters such as ethyl acetate and butyl acetate; fluorohydrocarbons such as 1,1,2-trifluorotrichloroethane. These organic solvents may be used alone or in combination of two or more.

There is no particular limitation in the type of synthetic resins to which the modifier can be applied, and effective results can be obtained in any type of resins. However, particularly typical synthetic resins may include polyethylene resins, polypropylene resins, polyvinyl chloride resins, polystyrene resins, ABS resins, AS resins, SB resins, vinyl chloride/vinyl acetate copolymer resins, polymethyl methacrylate resins, saturated polyester resins, polyamide resins, polyurethane resins, epoxy resins, phenol resins, amino resins, polycarbonate resins, polyfluorolefin resins, cellulose resins, silicone resins, polybutadiene resins, alkyd resins and melamine resins.

SYNTHESIS EXAMPLE

In a two l reaction vessel equipped with a stirrer, 134.1 g of organopolysiloxane represented by Formula:

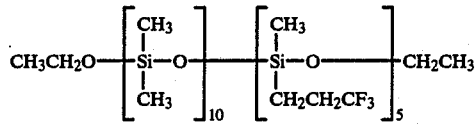

150 g of a polyoxyalkylene compound represented by Formula: $C_{17}H_{33}$—$(OC_3H_6)_{21}OH$, 15.2 g of myristic acid and 700 g of toluene were charged, and, after addition of 1.3 g of trifluoroacetic acid with stirring, the mixture was heated under reflux and ethanol formed was distilled away with toluene. Subsequently, 6.7 g of sodium hydrogencarbonate were added, neutralization was effected at 100° C. for 1 hour, and, after filtration, the filtrate was evaporated under reduced pressure for removal of a low boiling substance, whereupon there was obtained 213.8 g of a pale yellow viscous substance having a viscosity of 85 cSt (25° C.), a specific gravity of 1.052 (25° C.) and a refractive index of 1.4126 (25° C.). This was examined by an infrared absorption spectrum and NMR spectrum, and confirmed to be organopolysiloxane represented by the following formula. This is hereinafter designated as Compound S-1.

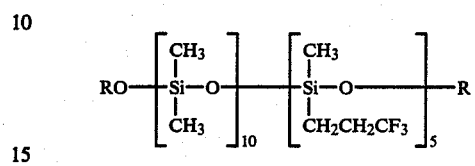

wherein R consists of $C_{13}H_{27}CO-$ and

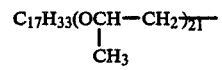

(weight ratio: 9:91).

Following the above procedures, Compounds S-2 to S-10 shown in the following table were synthesized.

TABLE

| Compound No. | Formula | X | |
|---|---|---|---|
| | | $R^1CO-$ | $R^2$—$(OC_qH_{2q})_r$ |
| S-2 | X—O—[Si(CH_3)(CH_3)O]_{10}—[Si(CH_3)(CH_2CH_2CF_3)O]_5—X | $C_{13}H_{27}CO-$<br>10% by weight | $C_{17}H_{33}$—$(OC_3H_6)_{21}$—<br>90% by weight |
| S-3 | X—O—[Si(CH_3)(CH_3)]_{10}—[SiO(CH_3)(CH_2CH_2CF_3)]_5—X | $C_7H_{15}CO-$<br>10% by weight | $C_{17}H_{33}$—$(OC_2H_4)_{10}$—<br>90% by weight |
| S-4 | X—O—[Si(CH_3)(CH_3)]_{10}—[SiO(CH_3)(CH_2CH_2CF_3)]_5—X | $C_{17}H_{35}CO-$<br>5% by weight | $C_{13}H_{27}$—$(OC_2H_4)_{10}$—<br>95% by weight |
| S-5 | X—O—[SiO(CH_3)(CH_3)]_{10}—[SiO(CH_3)(CH_2CH_2CF_3)]_5—X | $C_{17}H_{33}CO-$<br>10% by weight | $C_7H_{15}$—$(OC_3H_6)_{5}$—<br>90% by weight |
| S-6 | X—O—[SiO(CH_3)(CH_3)]_{50}—[SiO(CH_3)(CH_2CH_2C_4F_9)]_3—X | $C_{13}H_{27}CO-$<br>20% by weight | $C_{17}H_{33}$—$(OC_4H_8)_{15}$—<br>80% by weight |
| S-7 | X—O—[SiO(CH_3)(CH_3)]_{40}—[SiO(CH_3)(CH_2CH_2CF_3)]—X | $C_{11}H_{23}CO-$<br>2% by weight | $C_{21}H_{43}$—$(OC_3H_6)_{15}$—<br>98% by weight |

TABLE-continued

| Compound No. | Formula | X: $R^1CO-$ | X: $R^2{+}OC_qH_{2q}{)_r}$ |
|---|---|---|---|
| S-8 | $X-O{+}\begin{bmatrix}CH_3\\ \|\\ SiO\\ \|\\ CH_3\end{bmatrix}_{15}{+}\begin{bmatrix}CH_3\\ \|\\ SiO\\ \|\\ CH_2CH_2CF_3\end{bmatrix}_{15}{-}X$ | $C_9H_{19}CO-$<br>5% by weight | $C_{15}H_{31}{+}OC_2H_5{)_{40}}-$<br>95% by weight |
| S-9 | $X-O{+}\begin{bmatrix}CH_3\\ \|\\ SiO\\ \|\\ CH_3\end{bmatrix}_{10}{+}\begin{bmatrix}CH_3\\ \|\\ SiO\\ \|\\ CH_2CH_2C_4F_9\end{bmatrix}{-}X$ | $C_{11}H_{23}CO-$<br>10% by weight | $C_7H_{15}{+}OC_3H_6{)_{35}}-$<br>90% by weight |
| S-10 | $X-O{+}\begin{bmatrix}CH_3\\ \|\\ SiO\\ \|\\ CH_3\end{bmatrix}_{35}{+}\begin{bmatrix}CH_3\\ \|\\ SiO\\ \|\\ CH_2CH_2C_8F_{17}\end{bmatrix}_5{-}X$ | $C_{17}H_{33}CO-$<br>8% by weight | $C_{11}H_{23}{+}OC_2H_4{)_{10}}-$<br>92% by weight |

EXAMPLE 1

A reaction product from an epoxy resin Epikote 1004 (trademark; available from Shell Chemical Co.) and linseed oil in weight ratio of 1:1 was dissolved in toluene in concentration of 50% by weight. The resulting solution in amount of 1 part by weight was mixed with 3 parts by weight of an acrylic resin Aron 1001 (trademark; available from Toagosei Chemical Industry Co., Ltd.), and the mixture was adjusted with use of toluene to have a resin concentration of 40% by weight, thereby giving a coating material.

To the coating material thus obtained, 0.1% by weight each of the modifiers as shown in Table 1 was added and mixed. The resulting mixtures were applied on each two sheets of aluminum test panels (5×10 cm) by curtain coating and air-dried for 1 hour, followed by baking at 105° C. for 20 minutes to give films formed on the surface of the panels.

The test panels thus prepared were examined according to the following methods, in respect of the appearance of film surfaces, and also the friction coefficient, slip angle, and damage on films. The results are given in Table 1.

Dynamic coefficient of friction

Using a measurement apparatus for dynamic coefficient of friction, available from Kyowa Kaimen Kagaku K.K., measurement was carried out under the conditions of use of a SUS stainless steel ball as a frictioner, a load of 100 g and a speed of 50 mm/min.

Slip angle

Film surfaces of two test panels (5×5 cm) were face-to-face overlapped, and a load of 250 g was applied thereon. One end of the overlapped panels was gradually lifted until the upper panel slipped down to measure the slip angle.

Damage on films

Film surfaces of test panels (5×5 cm) were face-to-face overlapped, and, after the surfaces were forced to slip with a load of 250 g applied thereon, damage on the film surfaces were evaluated on the basis of the following three rank system:

A: No scratch and no clouding.
B: Slightly scratched and clouded
C: Considerably heavily scratched and clouded.

TABLE 1

| Test No. | Type of modifier | Dynamic friction coefficient | Slip angle | Damage on films | Appearance of film surfaces |
|---|---|---|---|---|---|
| *1 | None | 0.80 | 37° | C | somewhat irregular |
| *2 | Dimethyl-silicone fluid (20 cSt) | 0.38 | 27° | B | smooth |
| *3 | Dimethyl-silicone fluid (100 cs) | 0.58 | 31° | B | " |
| *4 | Oleic acid | 0.75 | 35° | C | " |
| 5 | S-1 | 0.30 | 20° | A | " |
| 6 | S-2 | 0.27 | 18° | A | " |
| 7 | S-5 | 0.30 | 21° | A | " |
| 8 | S-6 | 0.31 | 21° | A | " |
| 9 | S-7 | 0.30 | 20° | A | " |

Remarks:
Test number marked with asterisk "*" refers to a comparative example; ditto hereinafter.

EXAMPLE 2

| | |
|---|---|
| Bekkozol ER-3400 (an alkyd resin, available from Japan Reichhold Co.) | 38 parts by weight |
| Superbekkamin G-821 (a butylated melamine resin, available from Japan Reichhold Co.) | 20 parts by weight |
| Titanium oxide | 30 parts by weight |
| Xylene | 12 parts by weight |

Into 100 parts by weight of a white enamel coating material compounded as above, 0.2 part by weight each of the modifiers as shown in Table 2 was added and mixed, and the mixtures obtained were each applied on aluminum test panels.

After films thus formed on the panels were allowed to stand at room temperature for 7 days, the appearance thereof was examined and also the dynamic friction coefficient and slip angle were measured in the same manner as in Example 1, to obtain the results as shown in Table 2.

TABLE 2

| Test No. | Type of modifier | Dynamic friction coefficient | Slip angle | Damage on films | Appearance of film surfaces |
|---|---|---|---|---|---|
| *10 | None | 0.62 | 31° | C | irregular |
| *11 | Dimethyl-silicone fluid (100 cs) | 0.37 | 23° | B | smooth |
| *12 | Oleic acid | 0.51 | 27° | C | " |
| 13 | S-1 | 0.19 | 11° | A | " |
| 14 | S-3 | 0.22 | 13° | A | " |
| 15 | S-4 | 0.21 | 12° | A | " |
| 16 | S-8 | 0.19 | 11° | A | " |
| 17 | S-9 | 0.17 | 10° | A | " |

EXAMPLE 3

| | |
|---|---|
| Acryldick A-801 | 100 parts by weight |
| (an acrylic resin, available from Japan Reichhold Co.) | |
| Barnock D-750 | 15 parts by weight |
| (an urethane resin, available from Japan Reichhold Co.) | |
| Xylene | 4 parts by weight |
| Modifier (shown in Table 3) | 1.5 parts by weight | transparent coating materials compounded as above using various modifiers were each applied on printed plywood by means of a roll coater to have a coating amount of 30 g/m² each, followed by heat-curing at 60° C. for 15 minutes.

Films thus formed on the plywood were examined according to the following methods in respect of peel force (g/cm) by an adhesive tape and film-breaking by an adhesive tape, and also in respect of damage on films in the same manner as in Example 1. Results obtained are shown in Table 3.

Peel force (g/cm)

A pressure-sensitive adhesive cellophane tape 1.8 cm wide was pressure-adhered on the film surface under a load of 1 kg, and, thereafter, a peel force necessary for peeling the adhesive tape in the reverse direction parallel to the film surface was measured by use of a peel test machine (available from Toyo Tester Co.)

Film-breaking

An adhesive tape was pressure-adhered on the film surface in the same manner as in the above measurement of the peel force, and allowed to stand at room temperature for 7 days. Thereafter, the adhesive tape was abruptly peeled, and the state of the film surface after that was observed.

TABLE 3

| Test No. | Type of modifier | Peel force (g/cm) | Film-breaking | Damage on films |
|---|---|---|---|---|
| *18 | None | 180 | Film breaked | C |
| *19 | Dimethylsilicone fluid (350 cSt) | 160 | Film breaked | B |
| *20 | Oleic acid | 180 | Film breaked | C |
| *21 | Caprylic acid | 180 | Film breaked | C |
| 22 | S-1 | 70 | No break | A |
| 23 | S-5 | 70 | " | A |
| 24 | S-9 | 60 | " | A |
| 25 | S-10 | 60 | " | A |

EXAMPLE 4

Using a Henschel mixer, 100 parts of weight of a polyvinyl chloride resin TK-1000 (trade name; available from Shin-Etsu Chemical Co., Ltd.), 0.2 part by weight each of the modifiers as shown in Table 4, 20 parts by weight of calcium stearate, 3 parts by weight of calcium carbonate, 1 part by weight of polyethylene wax and 0.5 part by weight of an auxiliary stabilizer were mixed at 130° C.

The resin compositions thus obtained were each extruded into pellets by use of a monoaxial extruder. Some of the pellets were also extruded into square bars 3 mm square in section by use of a monoaxial extruder.

Torque (kg-cm), pressure (kg/cm²), extrusion rate (g/min) necessary for producing these pellets and square bars were examined, and, in respect of the square bars, tensile strength (yield value in kg/mm², break value in kg/mm² and elongation in %), impact strength (kg.cm/cm²) and thermal stability (min) were also examined, to obtain the results as shown in Table 4.

The tensile strength and the impact strength were measured at 20° C. and in accordance with JIS K 6745. The thermal stability was examined by leaving a test specimen in a Geer oven set to 170° C. and measuring the time by which the test specimen turned black.

TABLE 4

| | Type of modifier | (Extrusion of pellets) | | | (Extrusion of square bars) | | | Yield value | Break value | Elongation | Impact strength | Thermal stability |
|---|---|---|---|---|---|---|---|---|---|---|---|---|
| | | Torque | Pressure | Extrusion rate | Torque | Pressure | Extrusion rate | | | | | |
| *26 | None | 4.3 | 405 | 45.5 | 4.6 | 280 | 35.0 | 5.36 | 5.59 | 160 | 10.8 | 130 |
| *27 | Lead soap | 3.6 | 380 | 50.8 | 4.5 | 235 | 36.8 | 5.37 | 5.84 | 158 | 9.9 | 95 |
| 28 | S-1 | 4.0 | 390 | 50.3 | 4.5 | 240 | 36.5 | 5.35 | 5.70 | 160 | 13.0 | 150 |
| 29 | S-5 | 4.0 | 390 | 51.5 | 4.4 | 230 | 35.0 | 5.42 | 5.82 | 165 | 14.5 | 150 |
| 30 | S-6 | 3.8 | 350 | 53.0 | 4.0 | 200 | 36.5 | 5.36 | 5.83 | 160 | 13.4 | 140 |
| 31 | S-9 | 3.5 | 330 | 58.0 | 3.7 | 180 | 32.3 | 5.40 | 5.61 | 165 | 14.0 | 150 |

As will be seen from the results shown in Table 4, addition of the modifier of this invention can improve the processability of resinous compositions and the properties of the forms, showing much superiority to the case where the conventional lead soap is added.

EXAMPLE 5

| | |
|---|---|
| Nitrocellulose RS½sec | 100 parts by weight |
| (available from Daicel Chemical Industries, Ltd.) | |
| Vinylite-VY | 65 parts by weight |
| (a vinyl chloride/vinyl acetate copolymer resin, available from Union Carbide Corp.) | |
| Dioctyl phthalate | 60 parts by weight |

-continued

| | |
|---|---|
| Butyl acetate | 150 parts by weight |
| Modifier (shown in Table 5) | 45 parts by weight |

Transparent coating materials compounded as above using various modifiers were each applied on a steel plate by means of a roll coater to have a coating amount of 20 g/m² each, followed by heat-curing at 60° C. for 30 minutes to give cured films formed on the plate. Appearance of the surface of the films thus formed were examined, and, at the same time, dynamic coefficient of friction and damage on films were also measured in accordance with the methods below to obtain the results as shown in Table 5.

Dynamic coefficient of friction

Using a measurement apparatus for dynamic coefficient of friction, available from Kyowa Kaimen Kagaku K.K., measurement was carried out under the conditions of use of a SUS stainless steel ball as a frictioner, a load of 100 g and a speed of 50 mm/min.

Damage on films

Film surfaces (5×5 cm) were face-to-face overlapped, and, after the surfaces were forced to slip with a load of 1 kg applied thereon, damage on the film surfaces were evaluated on the basis of the following three rank system:
A: No scratch and no clouding.
B: Slightly scratched and clouded.
C: Considerably heavily scratched and clouded.

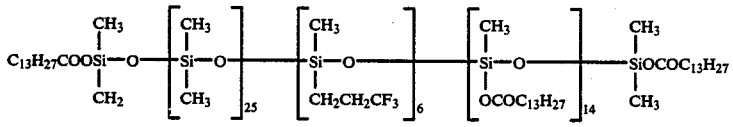

We claim:
1. A synthetic resin modifier comprising an organopolysiloxane represented by General Formula (I):

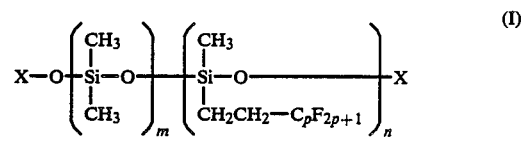

wherein the two types of diorganosiloxy units are arranged at random; the group represented by X consists of 2 to 40% by weight of a group represented by $R^1CO-$, wherein $R^1$ represents a saturated or unsaturated monovalent hydrocarbon group having 7 to 21 carbon atoms, and 60 to 98% by weight of a group represented by $R^2+O-C_qH_{2q}\!\!\!\!\!-]_l$, wherein $R^2$ represents a saturated or unsaturated monovalent hydrocarbon group having 7 to 21 carbon atoms, l represents an integer of 1 to 50, and q is a number of 2 to 4 on the average; m represents an integer of 1 to 50; n represents an integer of 1 to 20; and p represents an integer of 1 to 8.

2. A synthetic resin modifier according to claim 1, wherein the integer m is an integer of 10 to 50 and the integer n is an integer of 1 to 15.

3. A synthetic resin modifier according to claim 1, wherein the group X consists of 2 to 20% by weight of said group $R^1CO-$ and 80 to 98% by weight of said group $R^2+OC_qH_{2q}\!\!\!\!\!-]_l$.

4. A synthetic resin modifier according to claim 1, wherein the integer l represents an integer of 5 to 40.

* * * * *

TABLE 5

| Test No. | Type of modifier | Dynamic coefficient of friction | Damage on films | Appearance |
|---|---|---|---|---|
| *32 | None | 0.78 | C | smooth and non-blooming |
| *33 | Dimethylsilicone fluid (100 cSt/25° C.) | 0.65 | B | smooth and non-blooming |
| *34 | Organopolysiloxane A *(1) | 0.48 | A | blooming |
| *35 | Organopolysiloxane B *(2) | 0.53 | A | blooming |
| 36 | S-1 | 0.26 | A | smooth and non-blooming |
| 37 | S-2 | 0.28 | A | smooth and non-blooming |
| 38 | S-5 | 0.25 | A | smooth and non-blooming |
| 39 | S-9 | 0.22 | A | smooth and non-blooming |

Remarks:
(1) Organopolysiloxane A

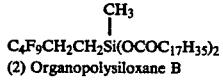
$C_4F_9CH_2CH_2Si(OCOC_{17}H_{35})_2$ (2) Organopolysiloxane B